Patented Aug. 23, 1949

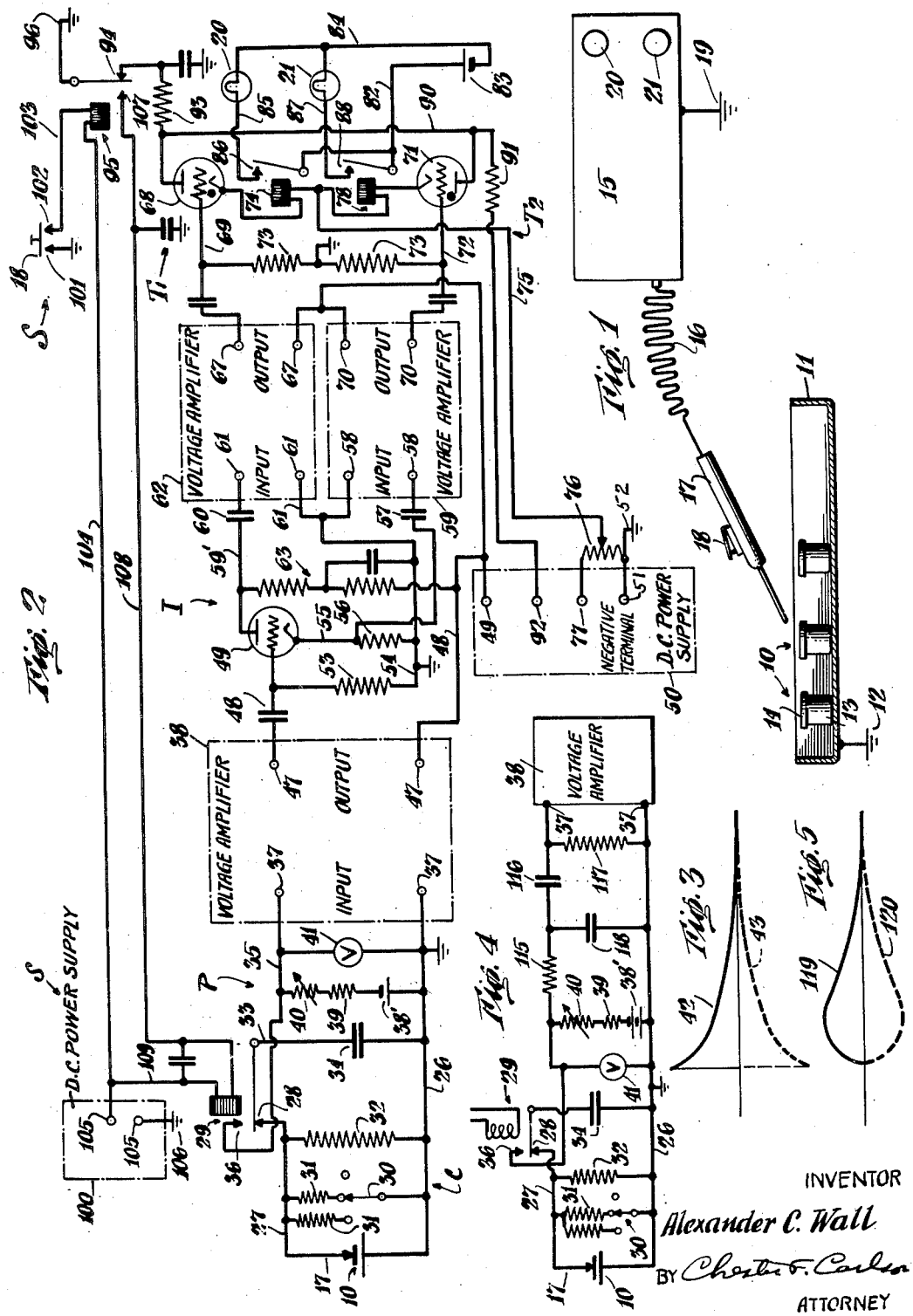

2,480,063

UNITED STATES PATENT OFFICE 2,480,063

CELL TESTING CIRCUIT

Alexander C. Wall, Indianapolis, Ind., assignor to P. R. Mallory & Co., Inc., Indianapolis, Ind., a corporation of Delaware Application October 6, 1945, Serial No. 620,729

3 Claims. (Cl. 175—183)

This invention relates to improved cell testing apparatus and a circuit therefor.

An object of the invention is to secure increased sensitivity in a cell tester without encountering the disadvantages usually found in high gain direct current amplifiers.

Another object of the invention is to disclose an improved circuit for cell testing apparatus.

Other objects of the invention will be apparent from the following description and accompanying drawing taken in connection with the appended claims.

The invention comprises the features of construction, combination of elements, arrangement of parts, and methods of operation referred to above or which will be brought out and exemplified in the disclosure hereinafter set forth, including the illustrations in the drawings.

In the drawings:

Figure 1 is a diagrammatic front elevational view, partially in section, of the cell testing apparatus;

Figure 2 is a schematic diagram of an improved cell testing circuit;

Figure 3 is a graph illustrating the form of pulse developed by the circuit;

Figure 4 is a schematic diagram of a modified form of pulsing circuit; and

Figure 5 is a graph showing the form of pulse generated by the circuit of Figure 4.

In the novel testing apparatus of this invention, a test datum, such as the voltage of a test cell, is utilized to charge a condenser so that the charge on the condenser is proportional to the test datum. The condenser is then switched out of circuit with the test datum and included in a pulse-generating circuit wherein the charge on the condenser is compared with a standard datum such as the electro-motive force developed by a standard voltage source. In this manner, a pulse is produced having an amplitude proportional to the deviation of the test datum from the standard datum and the polarity of the pulse is proportional to the sense of this deviation. This pulse is utilized for actuating suitable triggering devices such, for example, as gas tube trigger circuits, which in turn may actuate suitable controlled devices or indicators, one of said devices being actuated when the test datum exceeds the standard datum by a predetermined amount, another of said devices being actuated when the test datum is less than the standard datum by a predetermined amount. An additional feature of the circuit is a switching device utilized to reduce the voltage impressed upon the gas tube plates so that no current flows therethrough during the period when the test datum is connected to the condenser in the manner hereinbefore described. When the condenser is discharged through the pulse-generating circuit, the switching device restores the normal voltage of the gas tube plates so that the trigger circuits function in the usual manner. In some cases, only one trigger circuit and indicating device is utilized so that the tester is responsive either to excessively high or excessively low values of the test datum but not to both.

Such a circuit is advantageous in that the sensitivity of response is not affected by supply voltage variations as is the case with the conventional direct current amplifiers often used in tube testers. Moreover, since the current developed by the test datum is not directly amplified but is only used to charge a condenser, small radio frequency currents picked up by the input lines of the apparatus are not amplified and, hence, do not affect the functioning of the circuit. Accordingly, it is possible to utilize long unshielded lines from the test datum to the control apparatus without obtaining an undesirable pick-up of radio frequency current.

In the detailed description which follows, the circuit will be described in connection with comparing the voltage of the test cell with a standard cell but it will be understood that the apparatus is adapted for comparing other types of test data with a standard datum. Referring now to the drawings in detail, a plurality of cells to be tested are shown at 10 as supported by a metallic container or pan 11 which is grounded at 12. As shown, but not necessarily, the cathode of each cell may comprise a metallic cup as at 13 while the anode may comprise a flat circular disc, not shown, held within the rim 14 of the cup. The cell testing apparatus 15 may include a suitable casing from which extends a flexible cable 16 connected to a probe 17 which is adapted to contact the anodes of the test cells 10. Mounted on the probe 17 is a switch 18 which is utilized to close the testing circuit in the manner hereinafter described. The apparatus 15 is grounded at 19 and, accordingly, the cathodes 13 of the cells are electrically connected to the ground terminal of the cell testing apparatus although this connection can be made by a suitable conductor, if desired. Mounted on the container 15 are a pair of indicating lights 20 and 21, the indicator 20 being operated when the test cell voltage exceeds the maximum permissible value, the indicator 21 being operated when the cell voltage is below the minimum permissible value, as will be hereinafter more fully described.

Referring now to Figure 2, the charging circuit C may include the cathode of the test cell 10 which may be connected to a grounded conductor 26. It will be understood that this connection is formed by the pan 11 and the ground connections 12, 19, Figure 1. The anode of the cell 10 is shown in engagement with the probe 17 which is connected by a conductor 27 to a contact 28 of a relay 29. If it is desired to test the cell under load, a switch 30 may be provided to select one of a plurality of load resistors 31. It will be obvious that the switch 30 may be moved to open position if it is desired to test the cell under no load conditions. A shunt resistor 32 may also be connected between conductors 26 and 27, this resistor having a considerably higher value than the load resistors 31. The arm of relay 29 is connected by a conductor 33 to one terminal of condenser 34 which, in turn, is connected to the grounded conductor 26. It will be apparent that the test cell 10 charges the condenser 34 when the relay contacts are in the position shown, this charge being proportional to the voltage developed by the test cell.

A pulse-generating circuit P is provided which includes a conductor 35 connected between a contact 36 of relay 29 and an input terminal 37 of a voltage amplifier 38, the other input terminal 37 being connected to the grounded conductor 26. The pulse circuit further comprises a standard voltage source which consists of a cell 38' connected in series with a fixed resistor 39 and a variable resistor 40. The standard voltage source is connected between the conductors 26 and 35 and a volt meter 41 is provided to indicate the standard voltage. In the operation of the cell testing circuit, the variable resistor 40 is adjusted until the volt meter 41 registers the standard voltage with which the voltage of the test cell is to be compared. As previously stated, with the relay contacts 28, 36 in the position shown, the condenser 34 is charged by the cell 10 in proportion to the cell voltage. When the testing operation is initiated by pressing switch 18, the relay 29 is energized in the manner hereinafter described so that the arm of the relay engages the contact 36. In this manner, the condenser 34 is disconnected from the charging circuit C and connected in the pulse-generating circuit P so that the charge on the condenser opposes the electromotive force of the standard voltage source. Responsive to the closure of this circuit, the condenser discharges whereby an electrical pulse is produced and impressed upon the voltage amplifier 38, the amplitude of this pulse depending on the deviation of the cell voltage from the standard voltage. The polarity of said pulse may indicate that the cell voltage is greater than the standard voltage, in which case the pulse may assume the form shown at 42, Figure 3. If the cell voltage is less than the standard voltage, the pulse is of opposite polarity as indicated at 43, Figure 3. The values of the condenser 34 and resistors 39, 40 are preferably adjusted so that the pulses generated by discharge of the condenser 34 are critical or overdamped as will be apparent from inspection of the graph.

The pulses impressed upon the input terminal 37 of the voltage amplifier 38 are amplified thereby and the amplified pulse signals appear at the output terminals 47, one of which is connected through a condenser 48 to the grid of a vacuum tube 49, the other output terminal being connected by a conductor 48 to a positive terminal 49 of a direct current power supply 50, the negative terminal 51 of which is grounded as at 52. The grid of the vacuum tube 49 is also provided with a conventional grid leak resistor 53 which is grounded by a conductor 54. The last described components constitute the input portion of a phase inverter circuit indicated generally at I. The cathode of the tube 49 is connected by a conductor 55 to a grounded grid bias resistor 56 and a branch of conductor 55 extends through a condenser 57 to one input terminal 58 of a voltage amplifier 59, the other input terminal 58 being grounded by conductor 54. The plate of tube 49 is connected by a conductor 59 and a condenser 60 to an input terminal 61 of a voltage amplifier 62, the other input terminal 61 being grounded by conductor 54. The plate circuit of the tube 49 also includes a resistance-capacitance network generally indicated at 63 leading to the positive terminal of the power supply.

Assuming that a positive pulse is impressed on the grid of the tube 49, the plate of the tube becomes more negative and, accordingly, a negative signal appears at the input terminals of voltage amplifier 62. Responsive to said positive pulse, the cathode of the tube 49 becomes more positive and, hence, a positive signal is applied to the input terminals of the voltage amplifier 59. In similar fashion, a negative pulse impressed upon the grid of the tube 49 results in application of a positive signal to the voltage amplifier 62 and a negative signal to the voltage amplifier 59.

The amplified signal from the output terminals 67 of amplifier 62 is applied through a suitable condenser to the grid of a gas tube 68 by a conductor 69 forming part of a trigger circuit $T_1$, and the amplified signal appearing at the output terminals 70, 70 of amplifier 59 is applied to the grid of a gas tube 71 through a suitable coupling condenser and a conductor 72 forming part of a trigger circuit $T_2$. The input portions of the trigger circuits may include suitable conductors for applying current to the adjacent terminals 67, 70 from the power supply and suitable grid lead resistors 73 for the respective gas tubes 68, 71.

The cathode of gas tube 68 is connected through the solenoid coil of a relay 74 to a conductor 75 which extends to the arm of a potentiometer 76, the stationary terminals of which are connected respectively to ground and to a bias terminal 77 of the power supply. In similar fashion, the cathode of gas tube 71 is connected through the solenoid coil of a relay 78 to the conductor 75. It will be apparent that the potentiometer 76 regulates the negative bias applied to gas tubes 68 and 71.

The arms of the relays 74 and 78 are interconnected by a conductor 82, which leads to one terminal of a battery 83, the other terminal of which is attached by a conductor 84 to the controlled devices or indicators 20 and 21. The indicator 20 is also connected by a conductor 85 to a contact 86 on relay 74 while the indicator 21 is connected by a conductor 87 to a contact 88 on relay 78. It will be evident that the indicators 20 and 21 are energized upon actuation of the respective relays 74 and 78.

The plates of the gas tubes 68 and 71 are interconnected by a conductor 90 which passes through a resistor 91 to a positive terminal 92 on the power supply 50. A branch of the conductor 90 extends to a resistor 93 which is connected to a contact 94 of a relay 95, the arm of which is grounded as at 96. When the arm of relay 95 is in engagement with contact 94, the plates of the gas tubes are connected to ground through the resistor 93. When so connected, the potential impressed upon the plates of the gas tubes by the power supply is not sufficiently high to permit current to pass therethrough. When the arm of relay 95 is disengaged from contact 94 in the manner hereinafter described, sufficient voltage is applied to the plates of the gas tubes to permit said tubes to become conductive when the grid bias thereon falls below the cut-off value, said bias being adjustable, as previously stated, by varying the setting of the potentiometer 76. Assuming that the arm of relay 95 is disengaged from contact 94 and that the grids of the gas tubes are biased below the cut-off value, a positive signal impressed upon the grid of either gas tube which is of sufficient amplitude to overcome the cut-off bias thereon will cause the tube to become conductive and permit plate current to flow therethrough to thereby energize the relay in the cathode circuit of said tube and cause the associated indicator to function. When the arm of relay 95 is engaged from contact 94, the plate voltage is reduced sufficiently to stop the flow of current through the tube whereupon the relay contacts open and the indicator ceases to function.

The energization of the relays 29 and 95 is controlled by a switching circuit S including the switch 18 and powered by a direct current power supply 100. The circuit for energizing relay 95 may be traced through the grounded contact 101 of switch 18, contact 102, a conductor 103, the solenoid coil of relay 95, a conductor 104, the terminals 105 of the power supply 100 and a ground connection 106. Responsive to the closure of this circuit, the arm of relay 95 is disengaged from contact 94 and engages a contact 107 to thereby close a circuit which energizes relay 29. This latter circuit may be traced from the ground connection 96 through the arm of relay 95, contact 107, a conductor 108, the solenoid coil of relay 29, a conductor 109, the terminals of power supply 100 and the ground connection 106. Accordingly, it will be apparent that closure of the push button switch 18 energizes the relays 29 and 95, thus causing the plate voltage of the gas tubes to increase sufficiently to permit energization thereof by positive signals in the manner previously described. Also, the condenser 34 is disconnected from the charging circuit C and connected in the pulse-generating circuit P previously described.

The operation may be briefly summarized as follows:

With the push button switch 18 in open position, as shown, the probe 17 is applied to the anode of a test cell 10, thus completing the charging circuit through the arm of relay 29 and contact 28. Thereupon, condenser 34 is charged, the magnitude of the charge being proportional to the voltage of the test cell. The switch 18 is then momentarily closed, thus energizing the solenoids of relays 29 and 95. Responsive to the energization of relay 29, the condenser 34 is discharged through the pulse generating circuit P thereby producing a pulse, the amplitude of which is proportional to the deviation of the cell voltage from the standard voltage, the polarity of the pulse being dependent upon the sense of said deviation.

Assuming that a positive pulse as at 42, Figure 3, is produced when the cell voltage is greater than the standard voltage, such positive pulse will be amplified by the voltage amplifier 38 and impressed upon the grid of tube 49. Responsive to this energization of tube 49, an amplified negative signal is applied through voltage amplifier 62 to the grid of gas tube 68 and an amplified positive signal is applied through voltage amplifier 59 to the grid of gas tube 71. If the amplitude of the signal is so large as to indicate excessive deviation of the test cell voltage from the standard voltage, the trigger circuit $T_2$ will function since said positive signal will overcome the cut-off bias of tube 71 and permit plate current to flow therethrough, thus energizing relay 78 and operating indicator 21. In this connection, it will be noted that, at this time, the arm of relay 95 is disengaged from contact 94 so that the plate voltage on gas tube 71 is sufficiently high to permit plate current to flow therethrough. The relay 29 may, if desired, be constructed so that it will be energized a short time after relay 95 to insure that the gas tubes are supplied with sufficient plate voltage to permit the trigger circuits to operate in the described manner before functioning of the pulse-generating circuit. The amplified negative signal applied to the grid of gas tube 68 in the manner just described does not cause the associated trigger circuit $T_1$ to function since said signal merely increases the negative cut-off bias on the grid of the tube.

The probe 17 is then removed from the test cell 10 and the switch 18 is opened thus de-energizing relays 29 and 95. Responsive to the de-energization of relay 95, the arm thereof engages contact 94 with the result that the plate voltage on the gas tubes is lowered whereby gas tube 71 becomes non-conductive with the result that relay 78 is de-energized and the indicator 21 ceases to function. The de-energization of relay 29 causes the condenser 34 to be disconnected from the pulse generating circuit P and connected in the charging circuit C so that said condenser 34 may be again charged when the probe 17 is applied to a new test cell.

Assuming that the test cell voltage is unduly low as compared with the standard voltage, and that a negative pulse is produced as at 43, Figure 3, said pulse will be amplified and a positive signal will be applied to the grid of gas tube 68 thus causing energization of trigger circuit $T_1$ together with the associated relay 74 and indicating device 21 to show that the voltage of the test cell is below the tolerance range.

Accordingly, after the probe 17 is placed in contact with a test cell, an instantaneous test is obtained by momentarily closing the switch 18. If the voltage of the cell is above the maximum permissible value, one of the indicators will be operated whereas, if the voltage of the cell is below the minimum permissible value, the other indicator will be operated. The range of acceptable values may be readily varied by adjusting the grid bias on the gas tubes, potentiometer 76 being provided for this purpose. Due to the fact that the test cell voltage is not directly amplified but, instead, is utilized to charge a condenser which is not in circuit with the amplifier when it is being charged, undesirable effects due to pick-up of radio frequency and other interference are eliminated. It will be apparent to those skilled in the art that the apparatus and circuits of the invention may be easily modified for comparing a test datum, such as current or voltage, for example, with a standard datum in the testing of various types of circuit components. Furthermore, if it is not necessary to provide a test circuit which is responsive both to excessively low and excessively high values of the test datum, the phase inverter circuit I and one of the trigger circuits may be eliminated, the signal produced by the pulse-generating circuit being suitably amplified and impressed upon the other trigger circuit. In this manner, the testing device as a whole is responsive either to excessively high or excessively low values of the test datum but not to both.

A modified form of pulse-generating circuit is shown in Figure 4, this circuit providing a less abrupt initial rise in voltage when the pulse is produced to thereby minimize radio frequency disturbances occurring in the testing circuit. The arrangement is generally similar to that of the pulse-generating and charging circuits shown in Figure 2, corresponding parts being indicated by like reference numerals. In the modified circuit, a resistor 115 and a condenser 116 are connected in series between the standard voltage source and one input terminal 37 of the voltage amplifier 38. The modified circuit also includes a resistor 117 which is shunted across the input terminals 37 and a condenser 118, one end of which is connected between resistor 115 and condenser 116, the other end being connected to the grounded conductor 26. The operation is generally similar to the operation of the pulse-generating circuit shown in Figure 2 except that the initial voltage rise for each pulse is less abrupt. A typical pulse produced by the modified circuit is illustrated in Figure 5 in which 119 represents a pulse of one polarity while 120 represents a pulse of opposite polarity. It will be understood that the output circuits associated with the voltage amplifier 38 are similar to those of Figure 2.

While the present invention as to its advantages and objects has been described herein as carried out in a specific embodiment thereof, it is not desired to be limited thereby but it is intended to cover the invention broadly within the spirit and scope of the appended claims.

What is claimed is:

1. In apparatus for testing the voltage of a cell, the combination comprising a condenser; a standard cell; a test cell; pulse generating means for charging said condenser from said test cell and discharging said condenser through said standard cell in voltage opposition thereto, the discharge of said condenser producing a pulse having an amplitude proportional to the deviation of the cell voltage from the standard voltage, the polarity of said pulse being determined by the sense of said deviation; a trigger circuit having an input and output and including a gaseous discharge tube having a cathode, anode and grid responsive to pulses of one polarity, said pulses having an amplitude at least equal to a predetermined minimum triggering voltage; a trigger circuit having an input and output and including a gaseous discharge tube having a cathode, anode and grid responsive to pulses of opposite polarity, said pulses having an amplitude at least equal to a predetermined minimum triggering voltage; means for coupling each of said grids to said pulse generating means; means for varying the sensitivity of said trigger circuits to said pulses whereby said circuits are adjustable so as to respond only to pulses of a predetermined amplitude; and an indicating system including two indicators coupled in the output of said trigger circuits, one of said indicators being coupled to the anode of one of said tubes in the output side of one of said trigger circuits, the other indicator being coupled to the other anode of the other tube of the other one of said trigger circuits on the output side thereof.

2. In apparatus for checking a test cell, means for applying a test voltage in opposition to a standard voltage to produce a pulse having a polarity dependent upon the resultant sense of said opposition, two trigger circuits having a gaseous discharge tube respectively including a cathode and grid on the input side of each of said circuits and an anode and said cathode on the output side thereof, means including phase splitting means coupling the inputs of said circuits to said means whereby a predetermined tube of said trigger circuits is made responsive in accordance with one polarity of said pulse, the other tube of said circuits being responsive to a pulse of opposite polarity, and an indicating system including two indicators coupled to the outputs of said circuits, one of said indicators being in series with the anode and cathode of one of said tubes, the other one of said indicators being in series with the anode and cathode of the other one of said tubes.

3. In apparatus for testing the voltage of a cell for tolerance limits; a condenser; a standard cell; a test cell; pulse generating means for charging said condenser from said test cell and discharging said condenser through said standard cell in voltage opposition thereto, the discharge of said condenser producing a pulse having an amplitude proportional to the deviation of the cell voltage from the standard voltage, the polarity of said pulse being determined by the sense of said deviation; a trigger circuit having an input and output and including a gaseous discharge tube having a cathode, an anode and a grid responsive to pulses of one polarity, said pulses in the normal condition of said test cell having an amplitude at least equal to a predetermined minimum triggering voltage; a trigger circuit having an input and output and including a gaseous discharge tube having a cathode, an anode, and a grid responsive to pulses of opposite polarity, said pulses having an amplitude at least equal to a predetermined minimum triggering voltage; means including phase splitting means for coupling each of said grids to said pulse generating means; means coupled to said grids for varying the sensitivity of said trigger circuits to said pulses whereby said circuits are adjustable so as to respond only to pulses of a predetermined amplitude; and an indicating system including two indicators and relays coupled in the output of said trigger circuits; one of said indicators being coupled to the anode of one of said tubes, one of said relays being responsive to predetermined pulses so as to place said one indicator in the output side of one of said trigger circuits, the other indicator being coupled to the other anode of the other tube of the other one of said trigger circuits on the output side thereof through the response of another one of said relays effectively activated by predetermined pulses of opposite polarity.

ALEXANDER C. WALL.

REFERENCES CITED

The following references are of record in the file of this patent:

UNITED STATES PATENTS

| Number | Name | Date |
|---|---|---|
| 1,205,343 | Goodwin | Nov. 21, 1916 |
| 1,387,552 | Merritt | Aug. 16, 1921 |
| 1,851,947 | Mirick | Mar. 29, 1932 |
| 2,059,562 | Curtis | Nov. 3, 1936 |
| 2,133,670 | Schuchmann | Oct. 18, 1938 |
| 2,186,727 | Martin et al. | Jan. 9, 1940 |
| 2,209,883 | Gohorel | July 30, 1940 |
| 2,225,231 | Pugh | Dec. 17, 1940 |
| 2,226,459 | Bingley | Dec. 24, 1940 |
| 2,228,883 | Morgan | Jan. 14, 1941 |
| 2,285,482 | Wunsch | June 9, 1942 |
| 2,321,618 | Potts | June 15, 1943 |